(12) United States Patent
Freeman et al.

(10) Patent No.: US 11,503,815 B1
(45) Date of Patent: Nov. 22, 2022

(54) CAST NET SUPPORT APPARATUS

(71) Applicants: Cory Freeman, Alliton, FL (US); Jeffrey Freeman, Sarasota, FL (US)

(72) Inventors: Cory Freeman, Alliton, FL (US); Jeffrey Freeman, Sarasota, FL (US)

(*) Notice: Subject to any disclaimer, the term of this patent is extended or adjusted under 35 U.S.C. 154(b) by 0 days.

(21) Appl. No.: 17/217,718

(22) Filed: Mar. 30, 2021

(51) Int. Cl.
*A01K 75/04* (2006.01)

(52) U.S. Cl.
CPC .................................. *A01K 75/04* (2013.01)

(58) Field of Classification Search
CPC ........ A01K 75/00; A01K 75/04; A01K 74/00; A01K 77/00; A63B 71/085; A63B 71/088
USPC ........................................ 43/8; 128/861, 859
See application file for complete search history.

(56) References Cited

U.S. PATENT DOCUMENTS

| | | | |
|---|---|---|---|
| 4,324,061 A | 4/1982 | Stepp | |
| 5,365,946 A * | 11/1994 | McMillan | A63B 71/085 128/862 |
| 8,272,158 B1 | 9/2012 | Ball | |
| 8,603,393 B1 * | 12/2013 | DolceAmore | A61L 2/18 422/28 |
| 2005/0039372 A1 * | 2/2005 | Amore | A01K 74/00 43/8 |
| 2010/0258603 A1 * | 10/2010 | Swanson | A45F 5/00 224/604 |
| 2016/0219851 A1 * | 8/2016 | Lane | A01K 97/00 |
| 2018/0154241 A1 * | 6/2018 | Hazell | A63B 71/085 |

* cited by examiner

*Primary Examiner* — Peter M Poon
*Assistant Examiner* — Carly W. Lynch
(74) *Attorney, Agent, or Firm* — Sanchelima & Associates, P.A.; Christian Sanchelima; Jesus Sanchelima

(57) ABSTRACT

A cast net support apparatus including a mouthguard assembly and a cast net assembly is disclosed. These assemblies in conjunction with one another provide an easy-to-use casting net solution. The mouthguard assembly includes a mouthguard that is detachably tethered to the cast net assembly. The mouthguard includes a tether that is fastened to a rod. The rod is then inserted into a buoyant cast net support attachment that is in turn fastened to a net. When the user prepares the net for casting, they will grip the mouthguard that is tethered to the net edge in their mouth. Thereby affording them better support of the net before casting. The better support allows for a further and more accurate cast of the net. As the user casts the net the mouthguard tether detaches from the net leaving the user with the mouthguard in the user's mouth.

12 Claims, 5 Drawing Sheets

CAST NET SUPPORT APPARATUS

BACKGROUND OF THE INVENTION

1. Field of the Invention

The present invention relates to a cast net support apparatus and, more particularly, to a cast net support apparatus that is tethered to a mouthguard.

2. DESCRIPTION OF THE RELATED ART

Several designs for a cast net support apparatus have been designed in the past. None of them, however, include a tethered mouthguard attachment.

Applicant believes that a related reference corresponds to U.S. Pat. No. 8,272,158 issued for a lanyard having an easy-release clip that hangs from a user's neck and it used to support the edge of a cast net when throwing the net. Applicant believes another related reference corresponds to U.S. Pat. No. 4,324,061 for a device to assist a user in throwing a cast net that consists of a plate with a horn that is hung about the user's neck and supports a portion of the net edge. None of these references, however, teach of a cast net support apparatus with a buoyant attachment detachably tethered to a mouth guard.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cast net support apparatus which includes a mouthguard tethered to a cast net.

It is another object of this invention to provide a cast net support apparatus including a mouthguard tether attached to a rod which slidably engages to a buoyant net attachment.

It is still another object of the present invention to provide a cast net support apparatus including a buoyant net attachment that separates from the tethered mouthguard when the cast net is thrown.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
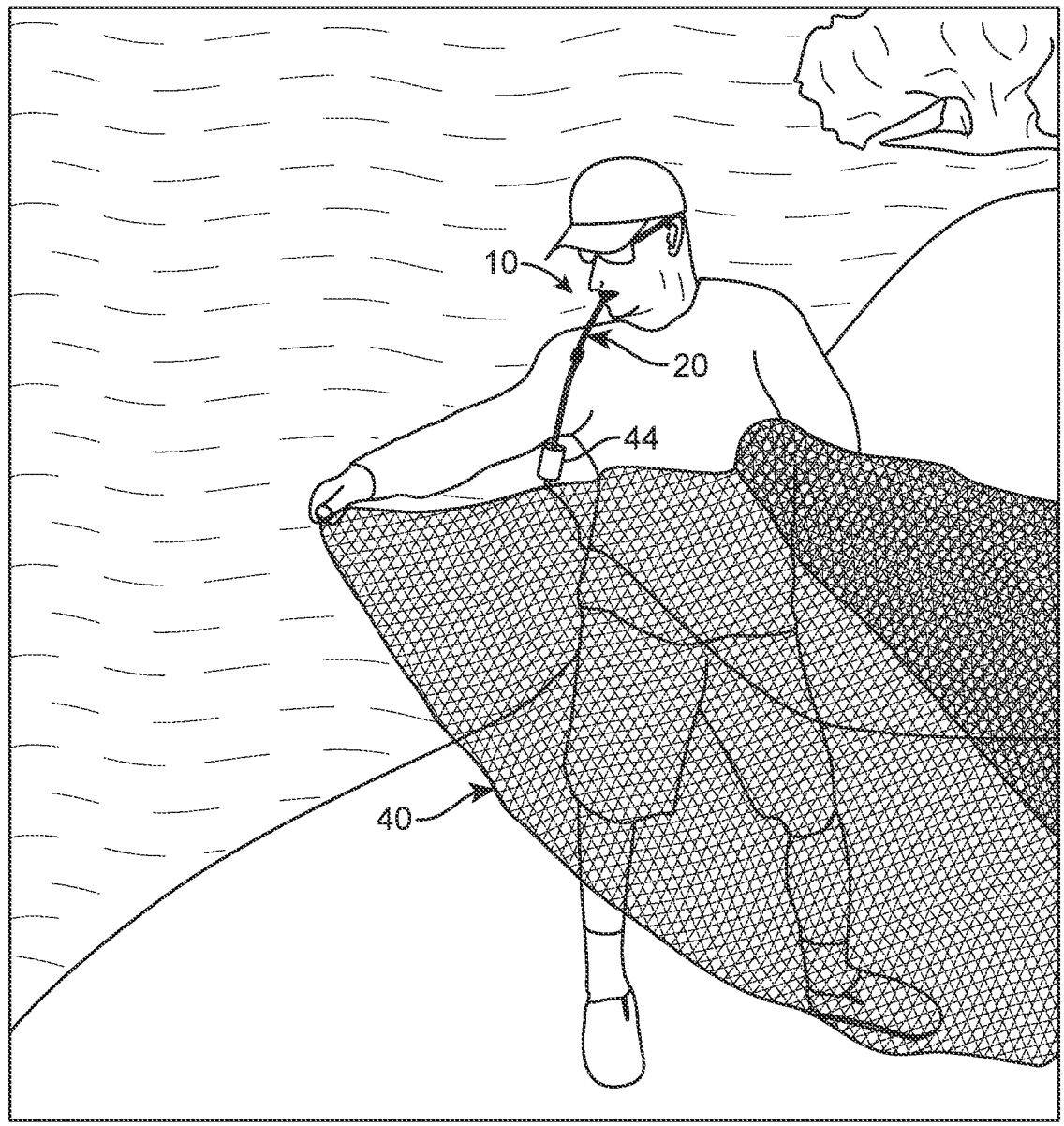
FIG. 1 represents an operational view of the mouthguard assembly 20 engaged with cast net assembly 40.

Referring now to the drawings, where the present invention is generally referred to with numeral 10, it can be observed that it basically includes a mouthguard assembly 20, and a cast net assembly 40.

Figure 2:
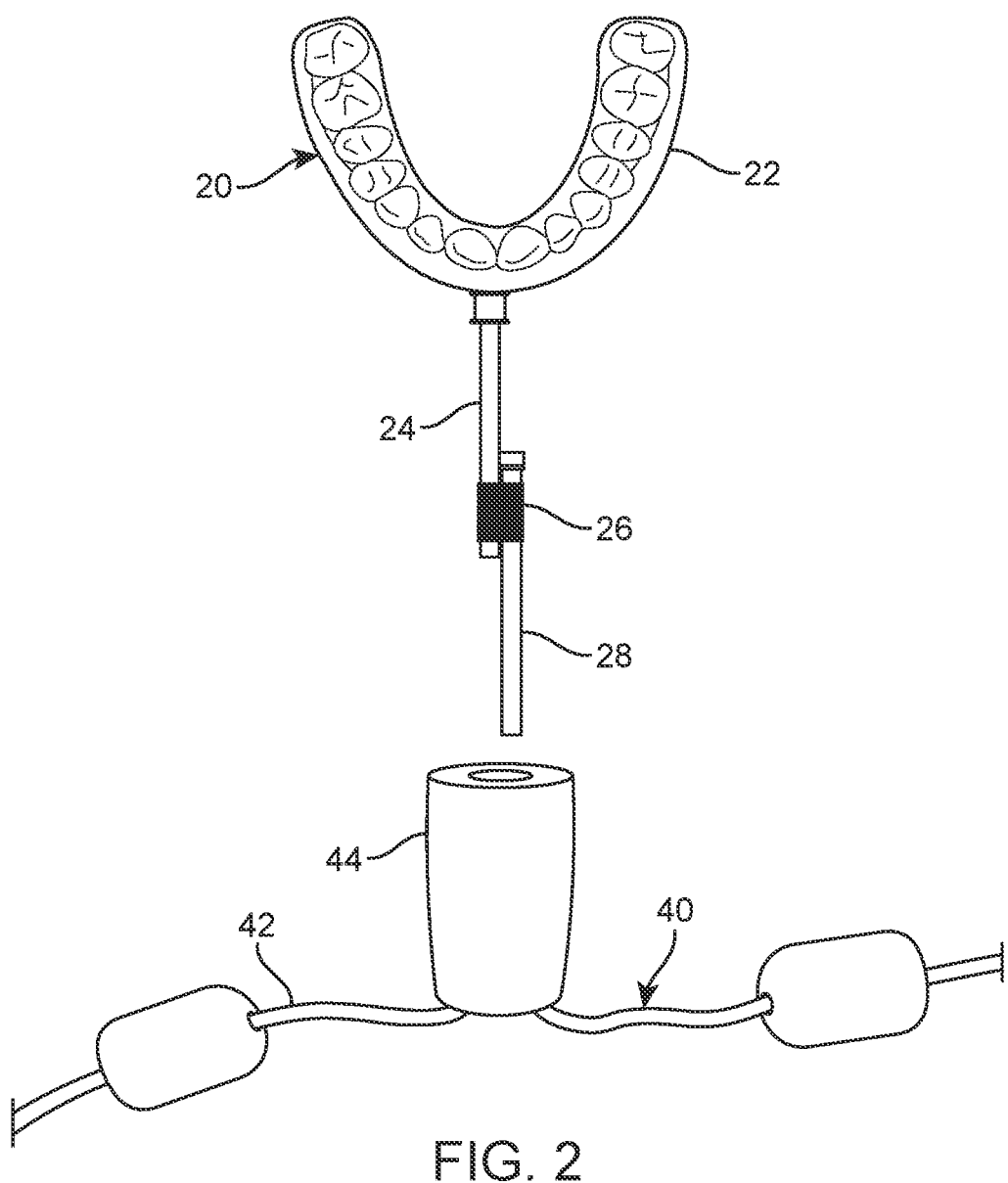
FIG. 2 shows a view of mouthguard assembly 20 detached from cast net assembly 40.

As best illustrated in FIG. 2, mouthguard assembly 20 may include a mouthguard 22 and a mouthguard tether 24. In one embodiment the mouthguard 22 may be a U-shape made of flexible material configured to fit within a user's mouth. The U-shape may align with a user's top and bottom teeth. In an alternate embodiment mouthguard 22 may be made of a thermoplastic material made to be softened in hot water and molded to a user's teeth. Thereby ensuring a more secure fit to the user. It should be understood that any other variation of mouthguard 22 may be implemented in the present system. The mouthguard 22 may have an interior and exterior. The exterior of mouthguard 22 may be the portion of mouthguard facing away from the user's mouth. The mouthguard 22 may be configured to be bit down on by a user's teeth comfortably. Thereby providing an anchor point for mouthguard assembly 20. Mouthguard 22 may have a mouthguard tether 24 attached to the exterior of the mouthguard 22. The mouthguard tether 24 may be an extension of the mouthguard 22. The mouthguard tether 24 may be fastened to a mouthguard member 28 via tether fastener 26. Tether fastener 26 may be a nylon string, adhesive, or clasp securing the mouthguard tether 24 to the mouthguard member 28. It may be preferable to have mouthguard 22 and mouthguard member 28 attached to opposite distal ends of mouthguard tether 24. It may be suitable for the mouthguard member 28 to be made of rigid material such as, plastic, wood, or metal. The mouthguard member 28 may include a head portion and a body portion. The body portion of mouthguard member 28 may be a cylindrical rod adapted to fit within member opening 46 of cast net assembly 40 via pressure. The head portion of mouthguard member 28 may be a larger cylinder with respect to the body of mouthguard member 28. This may allow for a more secure fastening point between mouthguard member 28 and mouthguard tether 24 via tether fastener 26.

Figure 4:
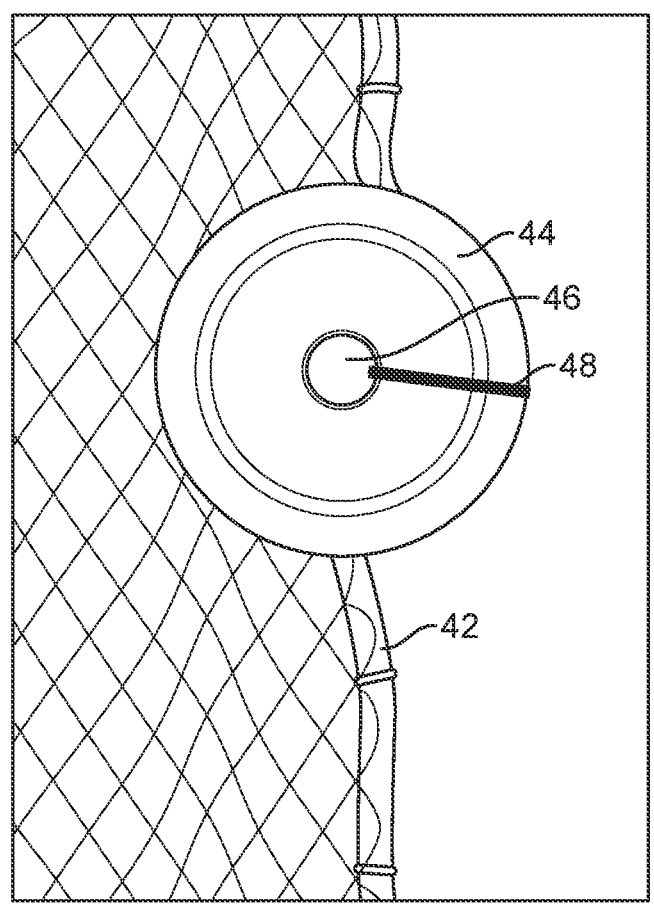
FIG. 4 is a representation of a top view of cast net support 44 fastened to cast net 42.
Figure 5:
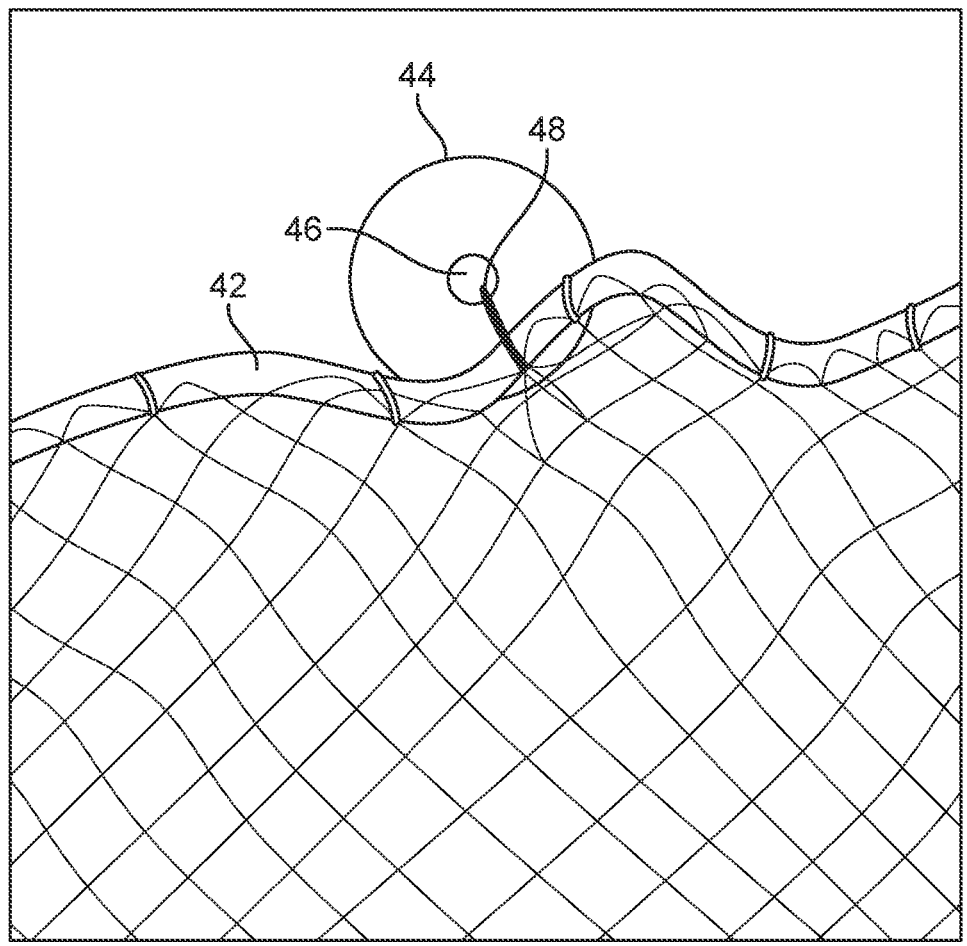
FIG. 5 depicts a bottom view of cast net support 44 fastened to cast net 42.

As best depicted in FIG. 4, cast net assembly 40 may include a cast net support 44. In one embodiment the cast net support 44 may be cylindrical with a top portion and a bottom portion. The cast net support 44 may also include an interior and an exterior. The top portion of the cast net support 44 may bow inward towards the bottom portion. Thereby forming a bowl of predetermined depth starting from the top portion of the cast net support 44. The member opening 46 may create a through hole from the top portion of cast net support 44 to the bottom portion of cast net support 44. Thereby spanning the entire center lateral length of the cast net support 44. It may be suitable for member opening 46 to be able to receive mouthguard member 28 fully and as such, secure it in place via pressure. In one iteration, member opening 46 may also serve as a mounting point for cast net support 44. It may be suitable for cast net support 44 to be secured to cast net 42 via cast net fastener 48. Cast net fastener 48 may take the form of a nylon string looping from the exterior of cast net support 44 through member opening 46 and attaching to cast net 42. In one embodiment cast net support 44 may be made out of a buoyant material such as lightweight foam, or cork. The buoyant material of cast net support 44 provides the added benefit of floating to the water's surface once the cast net 42 has been cast. This allows the user to locate and obtain the cast net support 44 easily after the cast net 42 has been cast. Thereby cutting down on set up time between recasting of the cast net 42.

Figure 3:
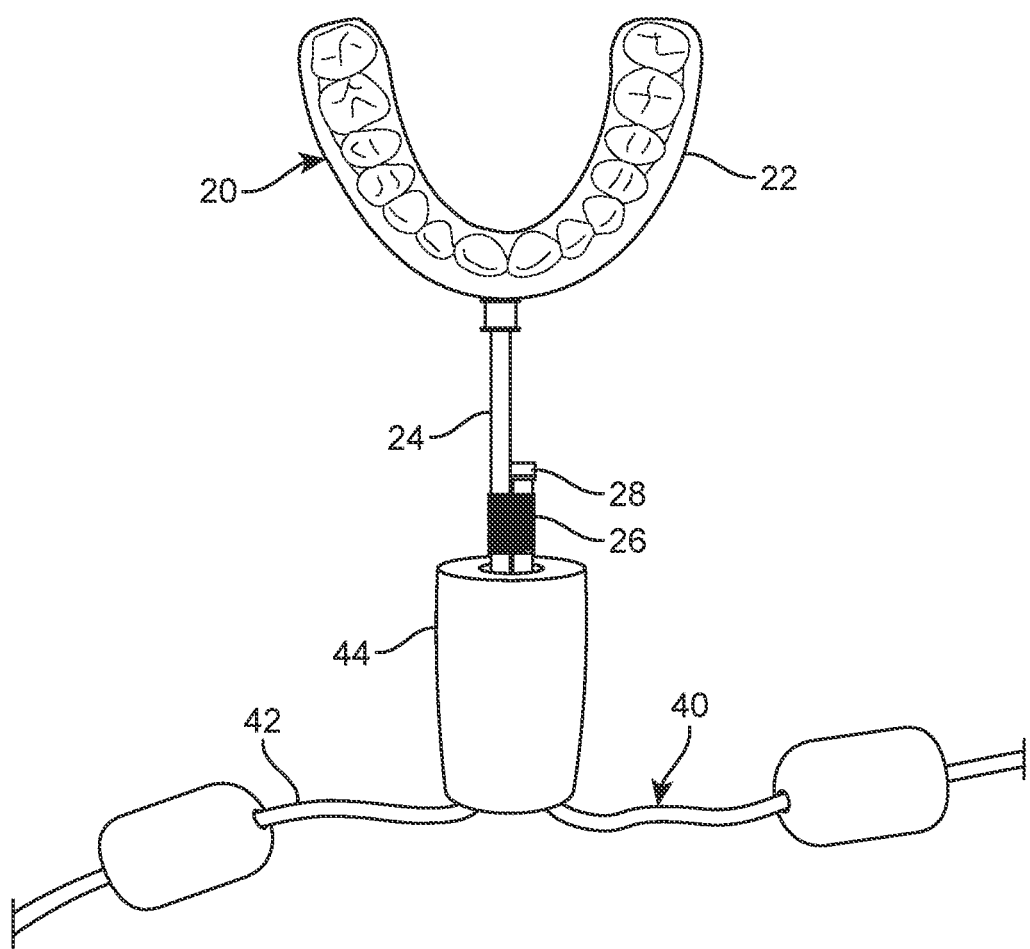
FIG. 3 illustrates mouthguard member 28 inserted into cast net support 44 via member opening 46.

Referring now to FIGS. 1 and 3, one can observe mouthguard 22 may serve as an anchor in a user's mouth. The mouthguard tether 24 may then be fastened to mouthguard member 28 via tether fastener 26. The mouthguard member 28 may be detachably secured to cast net support 44 by being received by member opening 46. The mouthguard member 28 may then be maintained in place via pressure. The cast net support 44 may be secured to cast net 42 with a cast net fastener 48. When a user casts cast net 42 the added support from cast net support 44 holding a section of the cast net 42 allows the user to handle the cast net 44 more easily before the cast. The force of the cast net 42 pulling away from mouthguard 22 may separate the mouthguard member 28 from member opening 46. Thereby allowing for more accurate cast without impeding the velocity of the cast.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a cast net support apparatus, comprising:
   a. a mouthguard assembly including a mouthguard fastened to a mouthguard member; and
   b. a cast net assembly including a cast net and a cast net support, said cast net support being a member with an interior, said interior including a through opening along a center lateral line creating a member opening, the member opening of the cast net support receives said mouthguard member, said mouthguard member secured into the member opening with pressure, said cast net support is made of a buoyant material adapted to float in water.

2. The system for a cast net support apparatus of claim 1 wherein said mouthguard includes a tether extending therefrom.

3. The system for a cast net support apparatus of claim 2 wherein said tether is fastened to said mouthguard member via a nylon string.

4. The system for a cast net support apparatus of claim 1 wherein said cast net support is a cylindrical member with a lateral side, a top portion, and a bottom portion.

5. The system for a cast net support apparatus of claim 4 wherein said top portion bows inward a predetermined depth toward the center lateral line.

6. The system for a cast net support apparatus of claim 1 wherein said buoyant material is expanded polystyrene foam.

7. The system for a cast net support apparatus of claim 1 wherein said buoyant material is cork.

8. The system for a cast net support apparatus of claim 1 wherein said mouthguard is made of thermoplastic material adapted to be molded to a user's mouth.

9. The system for a cast net support apparatus of claim 1 wherein said cast net includes a rope along an entire outer perimeter edge.

10. The system for a cast net support apparatus of claim 9 wherein said cast net support is fastened to the rope of said cast net.

11. A system for a cast net support apparatus, comprising of:
    a. a mouthguard assembly including a mouthguard, said mouthguard having a tether extending therefrom, said tether fastened to a mouthguard member, wherein the mouthguard member is a cylindrical rod including a head portion and a body portion, wherein said head portion has a greater diameter than the body portion; and
    b. a cast net assembly including a cast net with a rope along an entire outer perimeter edge and a cast net support, wherein said cast net support is fastened to said rope, the cast net support being a member with an interior, said interior including a through opening along a center lateral line creating a member opening, the member opening of the cast net support receives said mouthguard member, said mouthguard member secured into the member opening with pressure, said cast net support is made of a buoyant material adapted to float in water.

12. A system for a cast net support apparatus, consisting of:
    a. a mouthguard assembly including a mouthguard, the mouthguard having a tether extending therefrom, said tether fastened to a mouthguard member, wherein the mouthguard member is a rigid cylindrical rod including a head portion and a body portion, said head portion has a greater diameter than the body portion, said tether grasps the head portion of the mouthguard member via a member fastener, wherein the member fastener is a nylon string; and
    b. a cast net assembly including a cast net with a rope along an entire outer perimeter edge and a cast net support, wherein said cast net support is fastened to said rope, the cast net support being a cylindrical member with a lateral side, a top portion, and a bottom portion, wherein said top portion bows inward a predetermined depth toward a center lateral line, said cast net support further includes an interior, said interior including a through opening along the center lateral line creating a member opening, the member opening of the cast net support receives said mouthguard member, said mouthguard member secured into the member opening with pressure, said cast net support is made of an expanded polystyrene foam adapted to be buoyant in water.

* * * * *